(12) United States Patent
Melbye

(10) Patent No.: US 6,233,109 B1
(45) Date of Patent: May 15, 2001

(54) MAGNETIC TAPE DRIVE HAVING A SET OF HEADS CONFIGURED SUCH THAT AT LEAST ONE OF THE HEADS READS A DESIRED DATA TRACK

(75) Inventor: Hartvig E. Melbye, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/228,099

(22) Filed: Jan. 11, 1999

(51) Int. Cl.[7] ............................. G11B 15/12; G11B 21/02
(52) U.S. Cl. ................................. 360/63; 360/75
(58) Field of Search .................. 360/63, 64, 72.1, 360/72.3, 75, 77.12

(56) References Cited

U.S. PATENT DOCUMENTS

| 4,327,384 | 4/1982 | Tomita et al. . |
| 4,361,857 | 11/1982 | Sakamoto . |
| 4,370,685 | 1/1983 | Hosoi et al. . |
| 4,404,605 | 9/1983 | Sakamoto . |
| 4,420,778 | 12/1983 | Sakamoto . |
| 5,157,563 | 10/1992 | Nagasawa et al. . |
| 6,072,651 | * 6/2000 | Kato et al. ............... 360/63 |
| 6,084,735 | * 7/2000 | Kawada et al. ............ 360/63 |

* cited by examiner

Primary Examiner—W. Chris Kim
Assistant Examiner—Regina Y. Neal
(74) Attorney, Agent, or Firm—Brooks & Kushman P.C.

(57) ABSTRACT

Proper coverage of data tracks of a magnetic tape in a magnetic tape drive is ensured by providing a head assembly having a set of read heads configured such that at least one of the read heads reads a desired data track as the magnetic tape moves across the head assembly. At least one of the read heads reads the desired data track by creating lateral differential motion of the head assembly with respect to the longitudinally extending data tracks of the magnetic tape. The differential motion is either created by tracking irregularities between the head assembly and the magnetic tape or by dithering or wobbling the head assembly with respect to the magnetic tape. In operation, a controller selects one of the read data signals generated by the read heads to generate a read back signal. The read back signal is the read data signal from the at least one of the two read heads reading the desired data track.

15 Claims, 3 Drawing Sheets

MAGNETIC TAPE DRIVE HAVING A SET OF HEADS CONFIGURED SUCH THAT AT LEAST ONE OF THE HEADS READS A DESIRED DATA TRACK

TECHNICAL FIELD

The present invention relates generally to magnetic tape drives and, more particularly, to a magnetic tape drive having a set of heads configured such that at least one of the heads reads a desired data track.

BACKGROUND ART

Increased track densities in magnetic tape recording have necessitated the use of dedicated servo tracks to achieve proper read head to magnetic tape data track alignment. Because the magnetic tape itself is quite dimensionally unstable due to temperature, humidity, tension, stresses, etc., the track dimensions and their relative positions change as a function of time. This problem is further aggravated by differences between the head assembly and tape temperature coefficients and read head position tolerances within the head assembly. Further, read head geometry issues limit the closeness of read head transducer placements, resulting in relatively large physical dimensions for a multi-track head assembly. The above described dimensional issues in combination with servo positioning tolerances and narrower data track widths present severe obstacles to future higher track density magnetic tape drives.

SUMMARY OF THE INVENTION

Accordingly, it is a general object of the present invention to provide a method and system for reading a desired data track with a head assembly having a set of heads configured such that at least one of the heads reads the desired data track.

It is another object of the present invention to provide a method and system for reading a desired data track by selecting the read data signal of a head in a set of heads of a head assembly which is reading the desired data track.

It is a further object of the present invention to provide a method and system for reading a desired data track by creating differential motion between a head assembly having a set of heads and the desired data track such that at least one of the heads reads the desired data track.

It is yet another object of the present invention to provide a method and system for reading a desired data track by dithering or wobbling a head assembly having a set of heads with respect to the desired data track such that at least one of the heads reads the desired data track.

It is yet a further object of the present invention to provide a method and system for reading a desired data track such that at least one head of a set of heads in a head assembly reads the desired data track as tracking irregularities cause the head assembly to move with respect to the desired data track.

In carrying out the above objects and other objects, the present invention provides a magnetic tape drive. The magnetic tape drive includes a head assembly having two read heads for reading longitudinally extending data tracks of a magnetic tape and generating respective read data signals in response to reading the data tracks. The head assembly laterally moves with respect to the data tracks such that at least one of the two read heads reads a desired data track as the magnetic tape moves across the head assembly. A controller selects one of the two read data signals generated by the read heads to generate a read back signal. The read back signal is the read data signal from the at least one of the two read heads reading the desired data track.

Preferably, the controller physically oscillates the head assembly to laterally move the head assembly with respect to the data tracks. The physically oscillation is preferably sinusoidal. Tracking irregularities between the head assembly and the magnetic tape may also cause the head assembly to laterally move with respect to the data tracks.

In further carrying out the above objects and other objects, the present invention provides a method for reading magnetic tape within a magnetic tape drive having a head assembly provided with two read heads. The method includes reading longitudinally extending data tracks of a magnetic tape with the two read heads. Respective read data signals are then generated in response to reading the data tracks. The head assembly is then laterally moved with respect to the data tracks such that at least one of the two read heads reads a desired data track as the magnetic tape moves across the head assembly. One of the two read data signals generated by the read heads is then selected to generate a read back signal. The read back signal is the read data signal from the at least one of the two read heads reading the desired data track.

These and other features, aspects, and embodiments of the present invention will become better understood with regard to the following description, pending claims, and accompanying drawings.

BEST MODES FOR CARRYING OUT THE INVENTION

Figure 1:
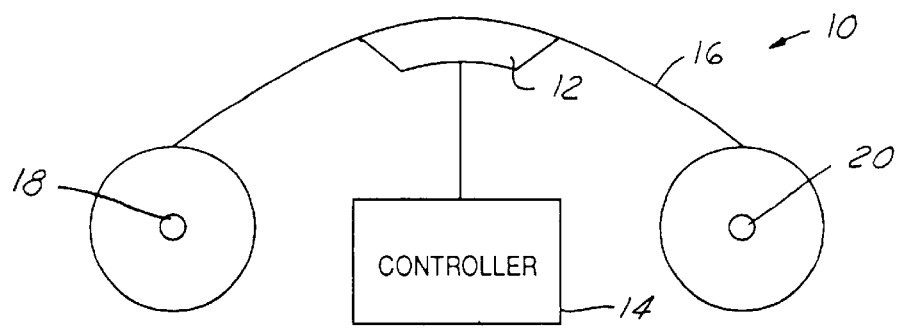
FIG. 1 illustrates a magnetic tape drive assembly in accordance with the present invention.

Referring now to FIG. 1, a magnetic tape drive assembly 10 in accordance with the present invention is shown. Magnetic tape drive assembly 10 includes a head assembly 12 and a controller 14. Head assembly 12 includes a set of at least two read heads each having a transducer which read data from magnetic tape 16. Head assembly 12 further includes a write head associated with the at least two read heads for writing data onto magnetic tape 16. Controller 14 controls head assembly 12 to read and write the data onto magnetic tape 16. Controller 14 also moves head assembly 12 to different positions with respect to magnetic tape 16. Controller 14 uses servo information contained on servo stripes of magnetic tape 16 to laterally align head assembly 12 with a desired data track of a desired data band on magnetic tape. As head assembly 12 reads and writes data onto magnetic tape 16, the magnetic tape is driven across head assembly 12 from a first spindle 18 to a second spindle 20.

Figure 2:
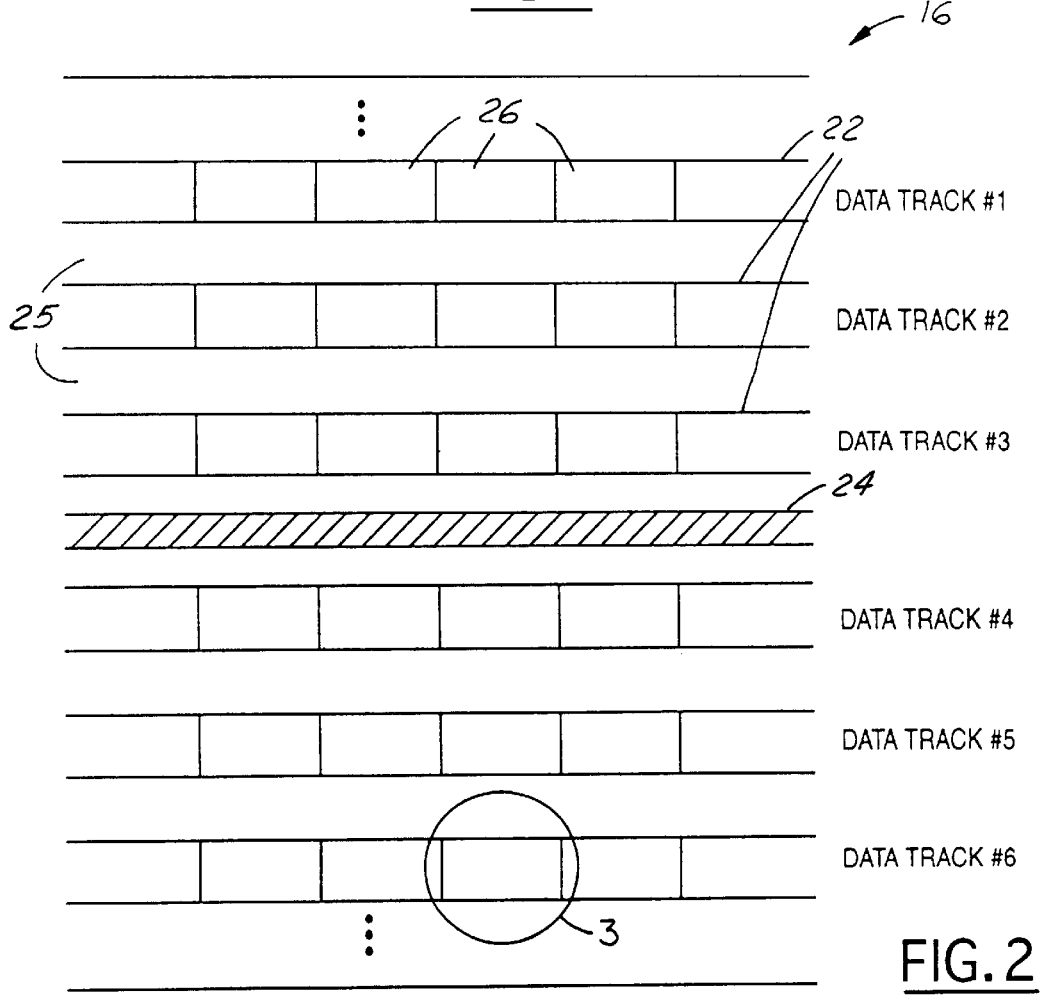
FIG. 2 illustrates the recording format of the magnetic tape used by the magnetic tape drive assembly shown in FIG. 1.

Referring now to FIG. 2, the recording format of magnetic tape 16 is illustrated. Magnetic tape 16 includes a plurality of longitudinally extending, laterally spaced apart data tracks 22 and at least one prerecorded servo track 24 interposed between the data tracks. Data tracks 22 may be separated from one another by guard bands 25. As head assembly 12 moves across magnetic tape 16, the head assembly reads servo track 24 and generates a position error signal. The position error signal is indicative of the lateral position of head assembly 12 with respect to magnetic tape 16. Controller 14 moves head assembly 12 as a function of the position error signal to enable servo track following and maintain a proper position with respect to data tracks 22.

Figure 3:
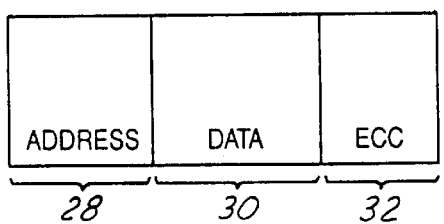
FIG. 3 illustrates the recording format of a data block of a data track of the magnetic tape shown in FIG. 2.

As shown in FIGS. 2 and 3, each data track 22 includes a group of longitudinally adjacent data segments or blocks 26. Each data block 26 includes an address identifier field 28, a data field 30, and an error correction code (ECC) field 32. Address identifier field 28 includes information regarding the number of the data track that the data block is a part of and the number of the data block itself along the data track. Data field 30 contains data written by the write head. ECC field 32 contains a correction code which corrects errors in the data read from data field 30 by the read heads. The correction code may be interspersed with the data in data field 30.

In operation, the write head of head assembly 12 writes data into data fields 30 of data blocks 26 of a desired data track 22. The write head of head assembly 12 also writes the address information and the ECC data into address identifier fields 28 and ECC fields 32, respectively. Controller 14 controls the position of head assembly 12 such that the write head writes all of the information including the data onto the desired data track 22 at the proper lateral position. Controller 14 either maintains the proper position of head assembly 12 with respect to the data track being written onto by referencing servo track 24 or adjacent data tracks. The latter technique is referred to as "bootstrapping."

Figure 4:
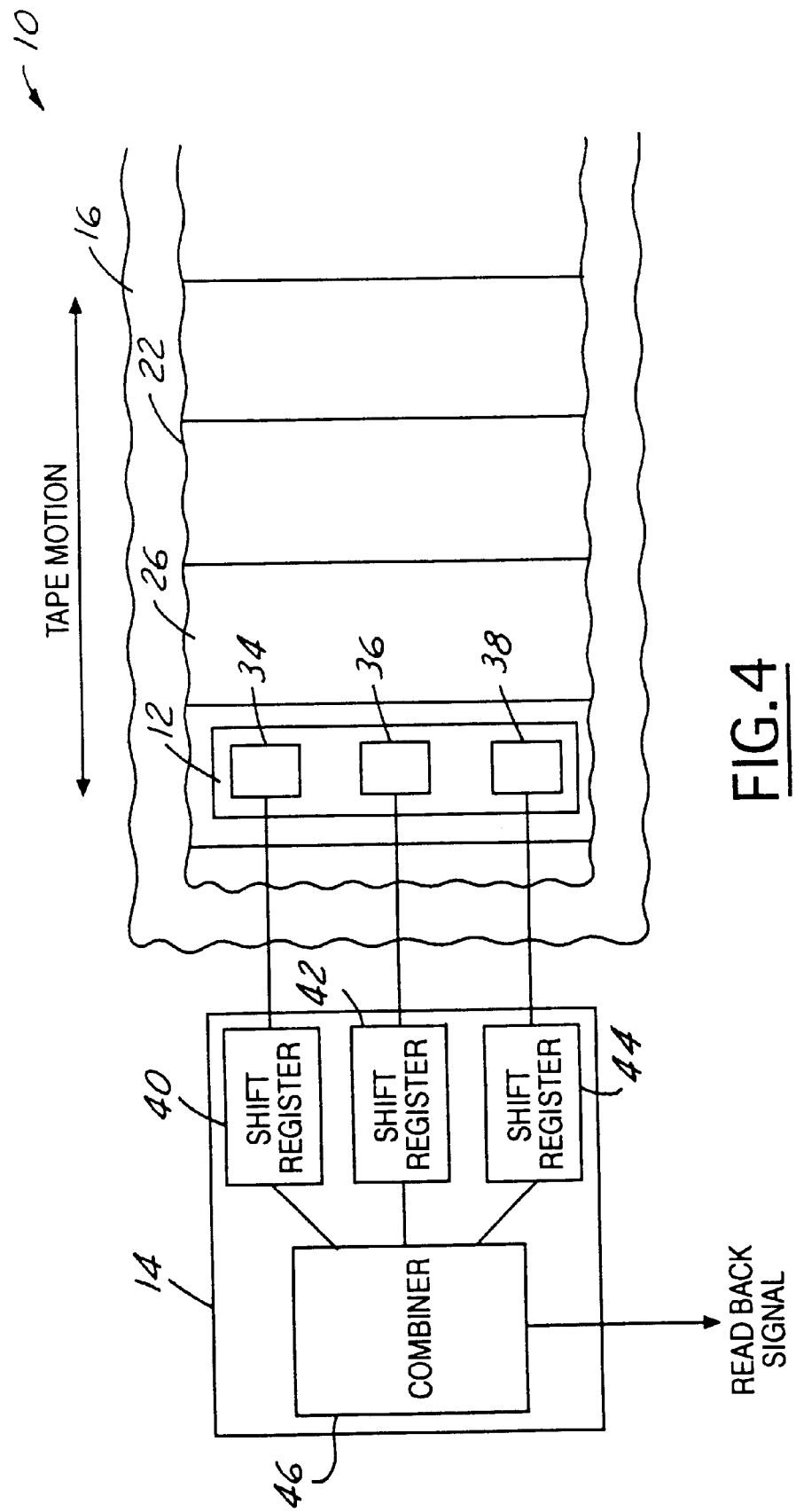
FIG. 4 illustrates the head assembly and the controller of the magnetic tape drive assembly shown in FIG. 1.
Figure 5:
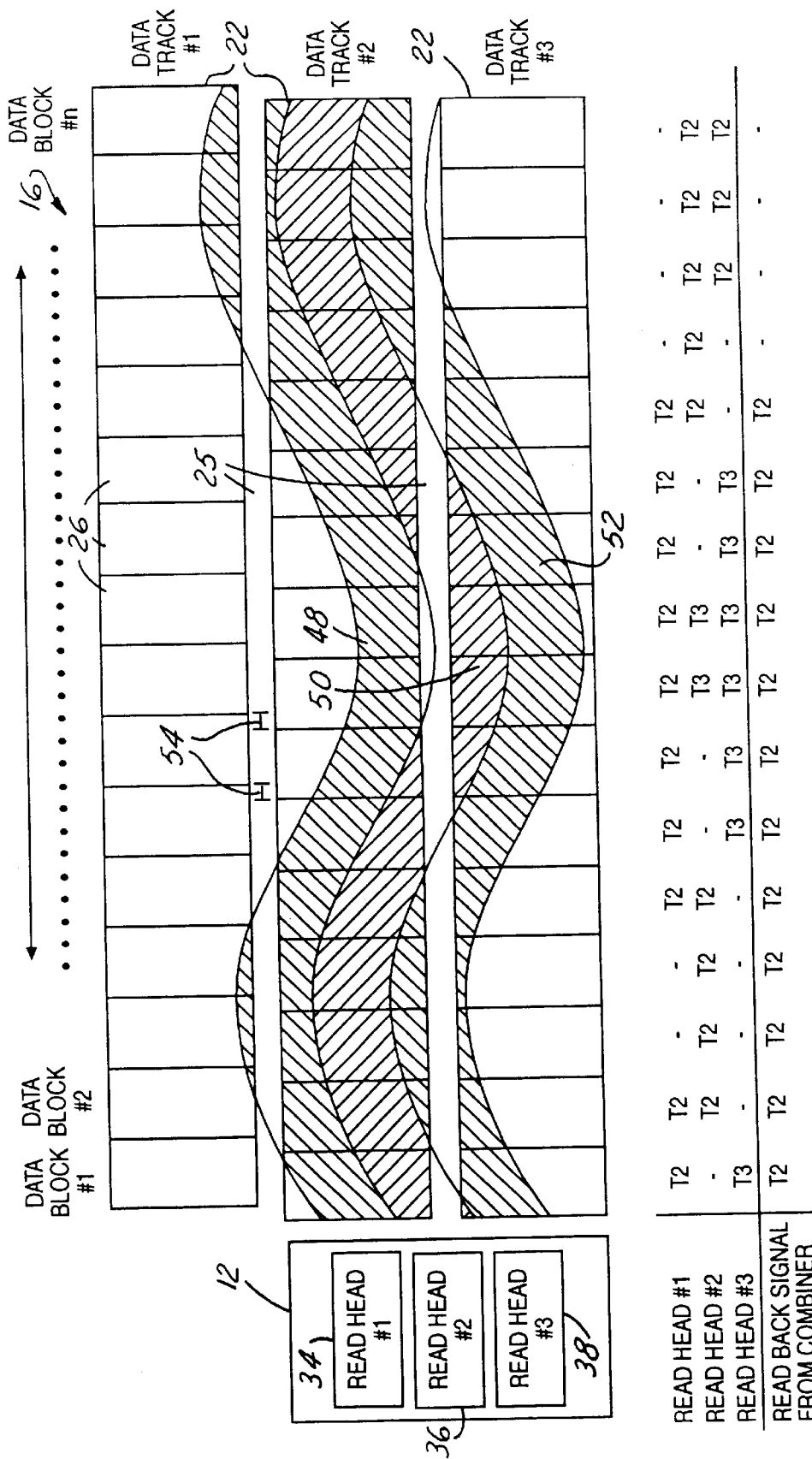
FIG. 5 illustrates the operation of the magnetic tape drive shown in FIG. 1.

Referring to FIGS. 4 and 5, the operation of magnetic tape drive assembly 10 will now be described. As mentioned above, magnetic tape drive assembly 10 includes a head assembly 12 and a controller 14. Head assembly 12 includes a set of fixed read heads 34, 36, and 38. Heads 34, 36, and 38 are either laterally spaced apart along head assembly 12 (as shown) or laterally overlap one another. Heads 34, 36, and 38 are laterally aligned with respect to magnetic tape 16 to read a desired data track 22 of the magnetic tape. During playback of magnetic tape 16, controller 14 attempts to control head assembly 12 such that the desired data track and no other data tracks are being read at one time. However, tracking irregularities and other factors discussed above may cause head assembly 12 and/or magnetic tape 16 to laterally be displaced. Undesired lateral movement of head assembly 12 with respect to magnetic tape 16 may cause the head assembly to overlap two or more adjacent data tracks such that the two or more data tracks are being read at one time by one head. This is a problem in the prior art because the summed signal from two data tracks read simultaneously by one head is unintelligible noise.

A feature of the present invention is that controller 14 includes shift registers 40, 42, and 44 each connected to a respective head 34, 36, and 38. Shift registers 40, 42, and 44 receive the data signals read by heads 34, 36, and 38 and then provide the individual read data signals to a combiner 46. Combiner 46 outputs a read back signal by selecting a desired one read data signal from shift registers 40, 42, and 44. The desired read data signal is a data signal read from the desired data track and it has the strongest ECC integrity and the least amount of noise of the other data signals read from the desired data track. The desired read data signal will be provided by a head which is properly aligned with the desired data track.

As shown in FIG. 5, head assembly 12 laterally moves with respect to data tracks 22. The lateral differential motion between head assembly 12 and magnetic tape 16 is caused by the tracking irregularities or by controller 14. The tracking irregularities create random differential motion and controller 14 creates selected differential motion. Controller 14 provides the selected differential motion by wobbling or dithering head assembly 12 with respect to magnetic tape 16 in a selected pattern. For instance, controller 14 may include an oscillator for imparting small vibrations to head assembly 12. The dithering may be sinusoidal as shown by envelope waveforms 48, 50, and 52. Envelope waveforms 48, 50, and 52 represent the area of data tracks 22 read by heads 34, 36, and 38.

In operation, heads 34, 36, and 38 are configured on head assembly 12 such that at least one of the heads reads the desired data track. For instance, assuming the desired data track is the second data track shown in FIG. 5 (data track #2), at least one of heads 34, 36, and 38 reads data track #2 as magnetic tape 16 longitudinally moves across head assembly 12. Initially, at data block #1, head 34 reads data track #2. Head 34 generates a read data signal T2 in response to reading data track #2. Simultaneously, head 36 also reads data track #2 and a small portion of data track #3. Because head 36 reads two data tracks the read data signal is noise. Accordingly, head 36 generates a noise signal designated as "–" in FIG. 5. While head 34 reads data track #2 and head 36 reads data tracks #2 and #3, head 38 reads data track #3 and generates a read data signal T3. Heads 34, 36, and 38 provide their respective read data signals to combiner 46. Combiner 46 then selects the desired read data signal from the three read data signals. Because the desired data track is data track #2, combiner 46 selects read data signal T2 from head 34. Combiner 46 then outputs read data signal T2 as the output read back signal.

Next, at data block #2, heads 34 and 36 read data track #2 and generate separate read data signals T2. Simultaneously, head 38 reads a part of data track #2 and a part of data track #3. Because head 38 reads two data tracks the read data signal is noise. Combiner 46 then selects the desired read data signal from the three read data signals. At this point, combiner 46 may select the read data signal T2 from either of heads 34 or 36. Combiner 46 selects the read data signal T2 from either of heads 34 or 36 based on which read data signal T2 has the highest ECC integrity. Combiner 46 then outputs the highest integrity read data signal T2 between heads 34 and 36 as the output read back signal. This process is continued as magnetic tape 16 longitudinally moves past head assembly 12. As shown in FIG. 5, combiner 46 continually outputs read data signal T2 as the other data blocks are being read as long as data track #2 is the desired data track. Thus, by physically displacing head assembly 12, there is always at least one head reading back proper data of the desired data track.

Combiner 46 ensures that the output read back signal for each data block 26 is from the desired data track by examining address field 28 of each data block. The address field 28 identifies data track 22 of which data block 26 is located. Combiner 46 compares the data track identification of data block 26 with the number of the desired data track. Combiner 46 also uses the ECC contained in ECC field 32 to help select the read data signal with the best integrity.

A common problem with writing data blocks 26 of a data track is that the data blocks are slightly longitudinally misaligned with the data blocks of other data tracks. For instance, as shown in FIG. 5, data blocks 26 of data track #1 are misaligned with data blocks 26 of data track #2 as indicated by gap misalignments 54. Accordingly, address field 28 of each data block 26 includes information identifying the number of the data block itself. Shift registers 40, 42, and 44 use the data block number of each of the data blocks being read by heads 34, 36, and 38 to clock out the gap misalignments and realign data blocks 26. Combiner 46 then determines which read data signals from shift registers 40, 42, and 44 to use based on the ECC integrity for the data block being read and then clocks out the selected read data signal to align properly with the preceding data block. By using the periodic reference addresses, shift registers 40, 42, and 44 and combiner 46 can reconstruct the combined data from different heads within head assembly 12.

Preferably, the lateral width of each data track 22 is larger than the lateral width of each head 34, 36, and 38 by a factor of at least two to ensure that at least one head reads the desired data track. The lateral width of each data track 22 is also a function of how close each head 34, 36, and 38 are positioned on head assembly 12 with respect to one another.

Similarly, the differential movement between head assembly 12 and magnetic tape 16 needs to be large enough such that proper coverage of the desired data track is obtained. Accordingly, dithering by controller 14 may be needed if the tracking irregularities are not sufficient to move head assembly 12 to obtain proper coverage of the desired data track. The data block longitudinal length determines the dithering frequency. Accordingly, the data block length needs to be smaller than the wavelength of dithering as shown in FIG. 5.

Thus it is apparent that there has been provided, in accordance with the present invention, a magnetic tape assembly and method of operation thereof that fully satisfy the objects, aims, and advantages set forth above.

While the present invention has been described in conjunction with specific embodiments thereof, it should be noted that the present invention may be used in a wide variety of different constructions encompassing many alternatives, modifications, and variations which are apparent to those with ordinary skill in the art. For instance, the additional heads contained on head assembly 12 could be employed to simultaneously read additional desired data tracks in conjunction with additional shift registers and combiners. Accordingly, the present invention is intended to embrace all such alternatives, modifications, and variations as fall within the spirit and broad scope of the appended claims.

What is claimed is:

1. A magnetic tape drive comprising:

a head assembly having two read heads for reading longitudinally extending data tracks of a magnetic tape, each of the two read heads generating respective read data signals in response to reading the data tracks, each of the read data signals containing information regarding the identity of the data tracks being read by the two read heads, wherein the head assembly laterally moves with respect to the data tracks such that at least one of the two read heads reads a desired data track as the magnetic tape moves across the head assembly; and a controller for selecting one of the two read data signals generated by the read heads to generate a read back signal, wherein the controller processes the read data signals to determine the identity of the data tracks being read by the two read heads, wherein the controller selects the one of the two read data signals to generate the read back signal by comparing the identity of the data tracks being read by the two read heads with the identity of the desired data track to determine the at least one of the two read heads reading the desired data track, wherein the read back signal is the read data signal from the at least one of the two read heads reading the desired data track.

2. The tape drive of claim 1 wherein:

the controller physically oscillates the head assembly to laterally move the head assembly with respect to the data tracks.

3. The tape drive of claim 2 wherein:

the physically oscillation is sinusoidal.

4. The tape drive of claim 1 wherein:

tracking irregularities between the head assembly and the magnetic tape cause the head assembly to laterally move with respect to the data tracks.

5. The tape drive of claim 1 wherein:

the controller includes a respective shift register connected to each read head and a combiner, wherein the read heads provide the read data signals to the shift registers and the combiner selects the read data signal to generate the read back signal.

6. The tape drive of claim 5 wherein:

each data track has a lateral width greater than the lateral width of each read head.

7. The tape drive of claim 1 wherein:

each data track includes a plurality of adjacent data blocks, each data block having an address field identifying the data track where the data block is located.

8. The tape drive of claim 7 wherein:

the address field includes an error correction code used by the combiner to select the one of the two read data signals generated by the read heads.

9. The tape drive of claim 1 wherein:

the read heads are laterally positioned apart from one another on the head assembly.

10. A method for reading magnetic tape within a magnetic tape drive having a head assembly provided with two read heads, the method comprising:

reading longitudinally extending data tracks of a magnetic tape with the two read heads;

generating respective read data signals from each of the two read heads in response to the two read heads reading the data tracks, each of the read data signals containing information regarding the identity of the data tracks being read by the two read heads;

laterally moving the head assembly with respect to the data tracks such that at least one of the two read heads reads a desired data track as the magnetic tape moves across the head assembly;

processing the read data signals to determine the identity of the data tracks being read by the two read heads; and selecting one of the two read data signals generated by the read heads to generate a read back signal by comparing the identity of the data tracks being read by the two read heads with the identity of the desired data track to determine the at least one of the two read heads reading the desired data track, wherein the read back signal is the read data signal from the at least one of the two read heads reading the desired data track.

11. The method of claim 10 further comprising:

physically oscillating the head assembly to laterally move the head assembly with respect to the data tracks.

12. The method of claim 10 wherein:

the physically oscillation is sinusoidal.

13. The method of claim 10 wherein:

each data track has a lateral width greater than the lateral width of each read head.

14. A magnetic tape drive comprising:

a head assembly having two read heads for reading longitudinally extending data tracks of a magnetic tape, each of the two read heads generating respective read data signals in response to reading the data tracks, each of the read data signals containing information regarding the identity of the data tracks being read by the two read heads; and a controller operable for laterally moving the head assembly with respect to the data tracks such that at least one of the two read heads reads a desired data track as the magnetic tape moves across the head assembly, the controller further operable to select one of the two read data signals generated by the read heads to generate a read back signal, wherein the controller processes the read data signals to determine the identity of the data tracks being read by the two read heads, wherein the controller selects the one of the two read data signals to generate the read back signal by comparing the identity of the data tracks being read by the two read heads with the identity of the desired data track to determine the at least one of the two read heads reading the desired data track, wherein the read back signal is the read data signal from the at least one of the two read heads reading the desired data track.

15. The tape drive of claim 14 wherein:

the physically oscillation is sinusoidal.

\* \* \* \* \*